(12) United States Patent
Teng et al.

(10) Patent No.: US 7,390,185 B2
(45) Date of Patent: *Jun. 24, 2008

(54) DRIVE ASSEMBLY FOR ROTATING AND TRANSLATING A SHAFT

(75) Inventors: Alex Teng, Richmond Hill (CA); John Robert Galt, Nobleton (CA); Martin Richard Kestle, Everett (CA)

(73) Assignee: Husky Injection Molding Systems Ltd., Bolton, Ontario (CA)

( * ) Notice: Subject to any disclaimer, the term of this patent is extended or adjusted under 35 U.S.C. 154(b) by 0 days.

This patent is subject to a terminal disclaimer.

(21) Appl. No.: 11/781,431

(22) Filed: Jul. 23, 2007

(65) Prior Publication Data

US 2008/0028758 A1 Feb. 7, 2008

Related U.S. Application Data

(63) Continuation of application No. 10/873,288, filed on Jun. 23, 2004, now Pat. No. 7,316,553.

(30) Foreign Application Priority Data

Aug. 25, 2003 (WO) .................. PCT/CA03/01260

(51) Int. Cl.
B29C 45/80 (2006.01)

(52) U.S. Cl. ........................................ 425/145
(58) Field of Classification Search ........... 425/145, 425/150

See application file for complete search history.

(56) References Cited

U.S. PATENT DOCUMENTS 4,105,147 A   8/1978   Stubbe
4,192,616 A   3/1980   Spanier
4,895,505 A   1/1990   Inaba et al.
5,540,495 A   7/1996   Pickel
5,645,868 A   7/1997   Reinhart
5,747,076 A   5/1998   Jaroschek et al.
5,804,224 A   9/1998   Inaba et al.
5,891,485 A   4/1999   Emoto
6,068,810 A   5/2000   Kestle et al.
6,108,587 A   8/2000   Shearer et al.
6,478,572 B1  11/2002  Schad
6,499,989 B2  12/2002  Koide et al.
6,517,336 B1  2/2003   Emoto et al.
6,530,774 B2  3/2003   Emoto
7,316,553 B2* 1/2008   Teng et al. ................. 425/145
2002/0168445 A1 11/2002 Emoto et al.

FOREIGN PATENT DOCUMENTS

DE   10135443 A1   3/2002
EP    0967064 A1  12/1999
EP    1162053 A2  12/2001
GB    1094037     12/1967
JP   61266218     11/1986
WO   WO 03/046388 A1  5/2003

* cited by examiner

Primary Examiner—Tim Heitbrink

(57) ABSTRACT

Disclosed is a drive unit operable to translate and rotate a shaft, the drive unit including: (i) a hollow electric motor having a rotor, (ii) a fluid cylinder, (iii) means for connecting the shaft to the rotor of the hollow electric motor, (iv) means permitting the shaft to move lengthwise coupled with the fluid cylinder, and (iv) means connecting the fluid cylinder to the shaft, whereby the shaft may be rotated by the hollow electric motor and moved lengthwise by the fluid cylinder, and wherein the fluid cylinder has an outer wall coupled with the rotor of the hollow electric motor.

24 Claims, 8 Drawing Sheets

DRIVE ASSEMBLY FOR ROTATING AND TRANSLATING A SHAFT

CROSS-REFERENCE TO RELATED APPLICATIONS

This patent application is a continuation patent application of prior U.S. patent application Ser. No. 10/873,288, which now U.S. Pat. No. 7,316,553 was filed 23 Jun. 2004 (Applicant reference number H-723-0-US). This divisional patent application also claims the benefit and priority of U.S. patent application Ser. No. 10/873,288, filed 23 Jun. 2004.

TECHNICAL FIELD

This invention relates to drive apparatus for rotating and translating a shaft. The invention is particularly useful for driving a plasticating screw of an injection-molding machine. More specifically, the invention relates to drive apparatus for rotating and reciprocating a plasticizing screw of an injection-molding machine wherein the screw is rotated by a hollow electric motor and reciprocated by a hydraulic piston.

BACKGROUND

The use of hollow motors and hydraulic pistons to drive and rotate plasticating screws is known. However, none of the known systems suggests combining the advantages of hollow motors to rotate the plasticating screw while using a hydraulic piston to move it lengthwise.

U.S. Pat. No. 4,105,147 to Stubbe describes a screw extruder rotated by a gear drive from an electric motor and moved lengthwise by a hydraulic piston. The screw has a splined shaft end to permit sliding of the shaft through the gear drive.

The U.S. Pat. No. 4,895,505 to Fanuc Ltd. describes a linear motor for moving an injection screw linearly. The linear motor includes a series of permanent magnets attached to the motor armature that react with the alternating current supplied to the surrounding stator windings to cause linear movement of the armature and the screw shaft attached to the armature. The patent describes the use of a hollow motor to move a screw shaft linearly.

The U.S. Pat. No. 5,540,495 issued Jul. 30, 1996 to Krauss-Maffei describes an extruder screw drive that includes a first motor for translating movement of the screw and a second motor for rotating the screw. The described embodiment shows two hollow motors. The drive means for translating the screw and the slide means for rotating the screw fit partially within one another.

U.S. Pat. No. 5,645,868 to Reinhart describes a drive apparatus for an injection unit that includes a hollow electric motor that engages the screw shaft through three clutches. One clutch provides rotation of the screw, a second enables forward movement of the screw and a third prevents the screw from rotating while it is being moved forward. No hydraulic units are used.

U.S. Pat. No. 5,747,076 to Jaroschek et al describes an injection-molding machine that uses a hydraulic piston to assist an electric motor driving a rack and pinion mechanism to advance the screw.

The U.S. Pat. No. 5,804,224 issued Sep. 8, 1998 to Fanuc Ltd. describes an arrangement where a ball screw is integrally formed on the rotor shaft. A motor positioned coaxially with it rotates the ball screw.

The U.S. Pat. No. 5,891,485 issued Apr. 6, 1999 to Sumitomo describes an injection apparatus that includes two hollow shaft electric motors. One motor is intended to rotate the screw shaft while the other moves it lengthwise. The rotors of the two motors are coupled to the shaft. Each rotor is located in a separate chamber.

U.S. Pat. No. 6,068,810 to Kestle et al describes an injection unit having a quill inside a piston to enable retraction and extension of the screw by the application of hydraulic pressure. A motor rotates the quill, which is connected to the piston through a spline to thereby rotate the screw. The motor attaches to the end of the quill.

U.S. Pat. No. 6,108,587 to Shearer et al describes an injection molding system that includes a motor for driving gears to rotate the screw and a hydraulic piston for translating the screw.

U.S. Pat. No. 6,478,572 to Schad describes an injection unit that uses a single electric motor to rotate an extruder screw and charge a hydraulic accumulator. The charge in the accumulator is directed to stroke the extruder screw.

U.S. Pat. No. 6,499,989 describes a device for removing disks from a mold. In the described embodiments a hollow electric motor is used to rotate the take-out shaft and a linear electric motor is used to move the shaft linearly. The hollow motor drives the shaft through a gearbox that enables the speed of the shaft to be varied. As an alternative, the patent suggests that a pneumatic or hydraulic cylinder could be used to move the shaft linearly. In the embodiments described, the linear actuator is located outside the rotary actuator. This provides an assembly that is larger and less cost effective.

U.S. Pat. No. 6,517,336 to Emoto et al and European Patent No. 0967064 A1 to Emoto disclose an injection molding system having a hollow electric motor that rotates a screw shaft and at the same time causes the shaft to advance by means of a connection to a ball screw shaft/spline shaft unit. A separate metering motor rotates the screw to load the screw with resin. Rotational movement is provided through a belt and pulley arrangement that can rotate the screw independently of the rotor on the hollow motor. The rotor on the hollow motor is attached to a splined portion of the screw shaft and is used to rotate the splined portion, which, in turn, rotates a ball screw to drive a ball nut and thereby move the shaft lengthwise.

U.S. Pat. 6,530,774 to Emoto describes an injection molding system using an electric motor and gear train to rotate the screw and a hollow shaft electric motor to move the screw lengthwise by driving a ball screw shaft through a splined shaft connection.

U.S. Patent Application No. 2002/0168445 A1 to Emoto et al describes an injection system that also includes a metering motor and a hollow shaft motor to rotate the screw and move the screw lengthwise, respectively.

The European Patent application 1162053 published Dec. 12, 2001 to Krauss-Maffei describes a two motor system where one motor provides rotational movement of the screw shaft and the other motor provides translational movement of the screw shaft. Clutch arrangements are used to enable the motors to operate separately or together.

The Japanese Patent 61266218 published Nov. 25, 1986 to Sumitomo describes a two motor injection system using hollow motors, a ball drive mechanism and splined shafts.

German Patent DE 10 135 443 discloses an injection unit for a plastics injection molding machine, featuring a plasticizing screw with a rotary drive and an electric motor with a stationary component mounted on a frame and an output component providing the linear axial screw motion for injecting the plastic melt into a mold. In known injection units of this kind, the output component of the electric motor is located in the power train between the drive component and the screw. The electric motor can be a linear or a rotary type whose rotary motion is converted into the linear motion of the output component. In both cases, the force that can be applied through the output component is limited.

PCT Patent Application WO 03/046388 A1 discloses an actuator (1) having a housing (1a) in which a driving shaft (2) is accommodated provided with a through bore (7), which through bore series as an actuated cylinder (3), at least one piston (4) mid a piston shaft (5) extending axially in said through bore, said at least one piston and said piston shaft being rotatable together with said driving shaft. Based on the known prior art, it is the aim of the invention to provide an improved actuator according to the above preamble, which obviates the described drawbacks, and which allows aa accurate and stable positioning of the piston shaft in axial direction. As a technical solution for this object the actuator according to the invention is characterised in that said at least one piston and said piston shaft is movable back and forth in both directions within said through horn hy actuating said cylinder. This allows an accurate positioning of the piston shaft relative to the driving shaft enabling the accurate operation of the actuator under various operating conditions.

While these references describe many combinations of electric and hydraulic driving systems for a screw of an injection-molding machine, they fail to describe a system combining the unique advantages of better control of the positioning of the screw with a hollow electric motor and the high injection power provided by a hydraulic injection unit. The present invention provides a compact injection unit having the unique advantages of both electric and hydraulic driving systems.

SUMMARY

The present invention provides a drive unit operable to translate and rotate a shaft, the drive unit including: (i) a hollow electric motor having a rotor, (ii) a fluid cylinder, (iii) means for connecting the shaft to the rotor of the hollow electric motor, (iv) means permitting the shaft to move lengthwise coupled with the fluid cylinder, and (iv) means connecting the fluid cylinder to the shaft, whereby the shaft may be rotated by the hollow electric motor and moved lengthwise by the fluid cylinder, and wherein the fluid cylinder has an outer wall coupled with the rotor of the hollow electric motor.

According to one general aspect of the present invention, the drive unit is a part of an injection unit for an injection-molding machine with a hollow electric motor to rotate the injection screw and a hydraulic piston to reciprocate the screw.

DETAILED DESCRIPTION OF THE PREFERRED EMBODIMENTS

Figure 1:
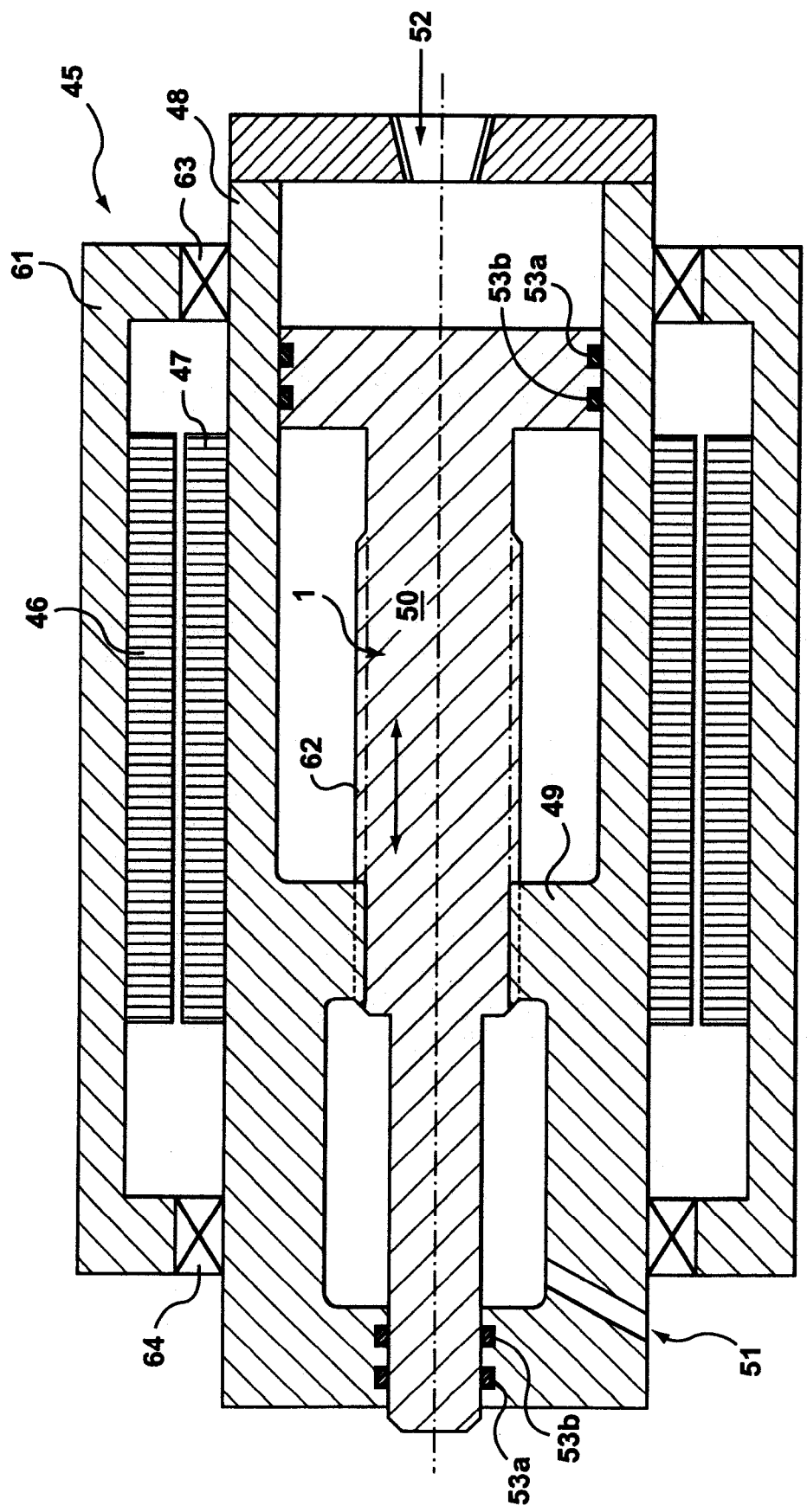
FIG. 1 is a cross-sectional sketch of a basic drive unit in accordance with the invention.

FIG. 1 illustrates the invention in a simple form. As shown in FIG. 1, a hollow shaft motor 45 has a housing 61, a stator 46 and a rotor 47. Stator 46 is shown mounted on a wall of housing 61. The rotor 47 is fixed onto cylinder 48. Cylinder 48 has a spline portion 49 formed on its interior surface. An insert fitted onto the cylinder 48 could replace the spline portion 49. The spline portion 49 engages splines 62 (one shown) on a piston 50. A shaft (not shown) integral with or attached to the piston 50 is rotated by motor 45 through the interconnection between the rotor 47 and the piston 50.

The shaft attached to the piston 50 is moved lengthwise by applying fluid pressure to either side of the head of the piston 50 through openings 51 and 52 in the wall of cylinder 48. When the drive unit is being used in an injection-molding machine, the fluid might be hydraulic oil or a water-based graphite solution. Piston 50 slides on spline portion 49 and rotates in bearings provided by wear rings 53a and fluid seals 53b. The entire assembly of rotor 47, cylinder 48 and piston 50 is rotatably supported and axially located in bearings 63 and 64.

While FIG. 1 illustrates a rudimentary sketch of the invention, those skilled will be able to make any minor modifications necessary to the construction of an acceptable drive unit in accordance with the invention. For example, means other than a spline shaft could be provided to permit sliding of the shaft while keeping the shaft rotatable. A single key sliding along a keyway could be used.

The drive unit will now be described with reference to a plasticating screw for an injection-molding machine. The invention is particularly suited to use in such a system where it is necessary to rotate the screw to melt the injection material and move the screw lengthwise with significant driving force to inject the material into a mold.

Figure 2:
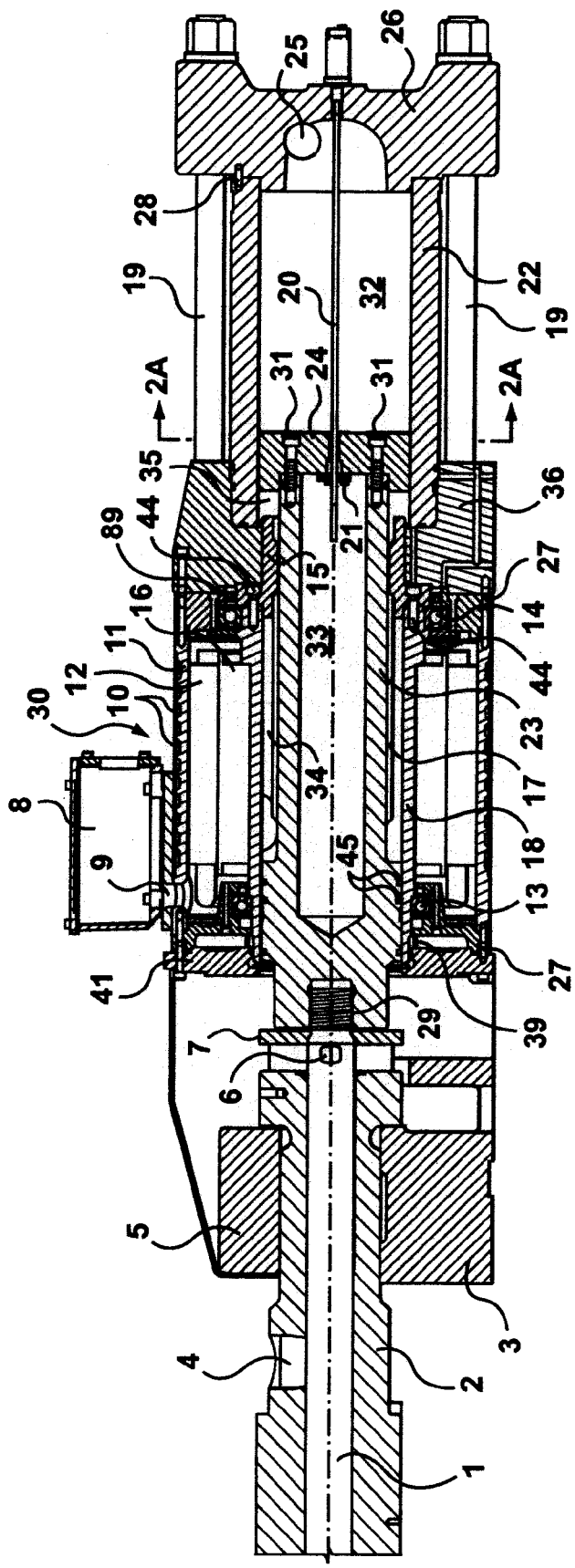
FIG. 2 is a cross-sectional side view of a preferred embodiment of the drive unit for an injection molding machine where the drive unit is in an extended position.
Figure 3:
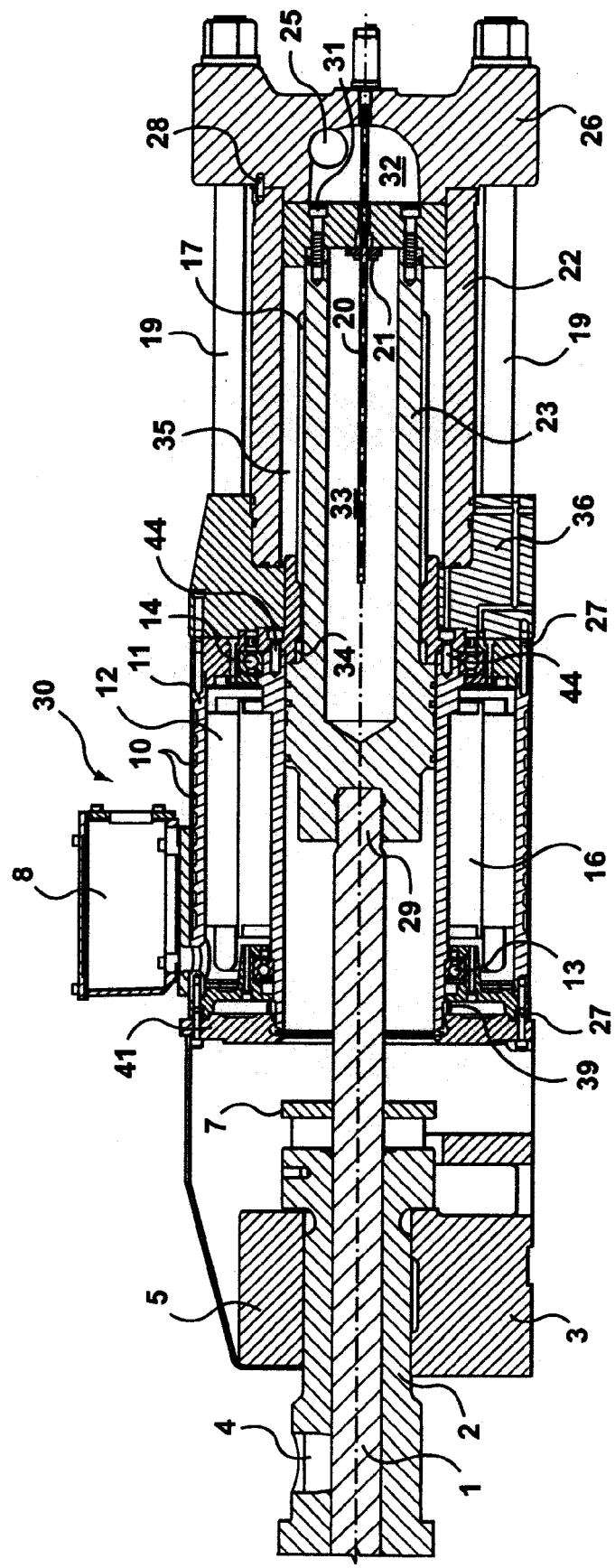
FIG. 3 is a cross-sectional side view of the preferred embodiment of the drive unit for an injection molding machine where the drive unit is in a retracted position.

Referring to FIGS. 2 and 3, a screw 1 resides in a barrel 2 and can rotate and move axially therein. Injection material, such as plastic pellets, is fed to screw 1 through opening 4. Barrel 2 is mounted in injection housing 3 and kept in place by means of a barrel retaining plate 5. The slot 6 is designed to receive a tool to hold the screw 1 in place while the piston 23 is rotated to unscrew the piston 23 from the screw 1 at the threaded connection 29. Piston stop 7 is designed to prevent rotation of the tool when the piston 23 is being retracted from the screw 1 and determines the fully extended position of the piston 23. This facility is provided to enable removal and replacement of the screw 1 when necessary.

The forward portion of piston 23 contacts the cylinder wall 18 through piston rings 45. The piston 23 moves axially along the wall 18 as the screw 1 is advanced and retracted. Spline slots 17 slide in spline insert 15 to enable the piston 23 to move lengthwise.

Figure 4:
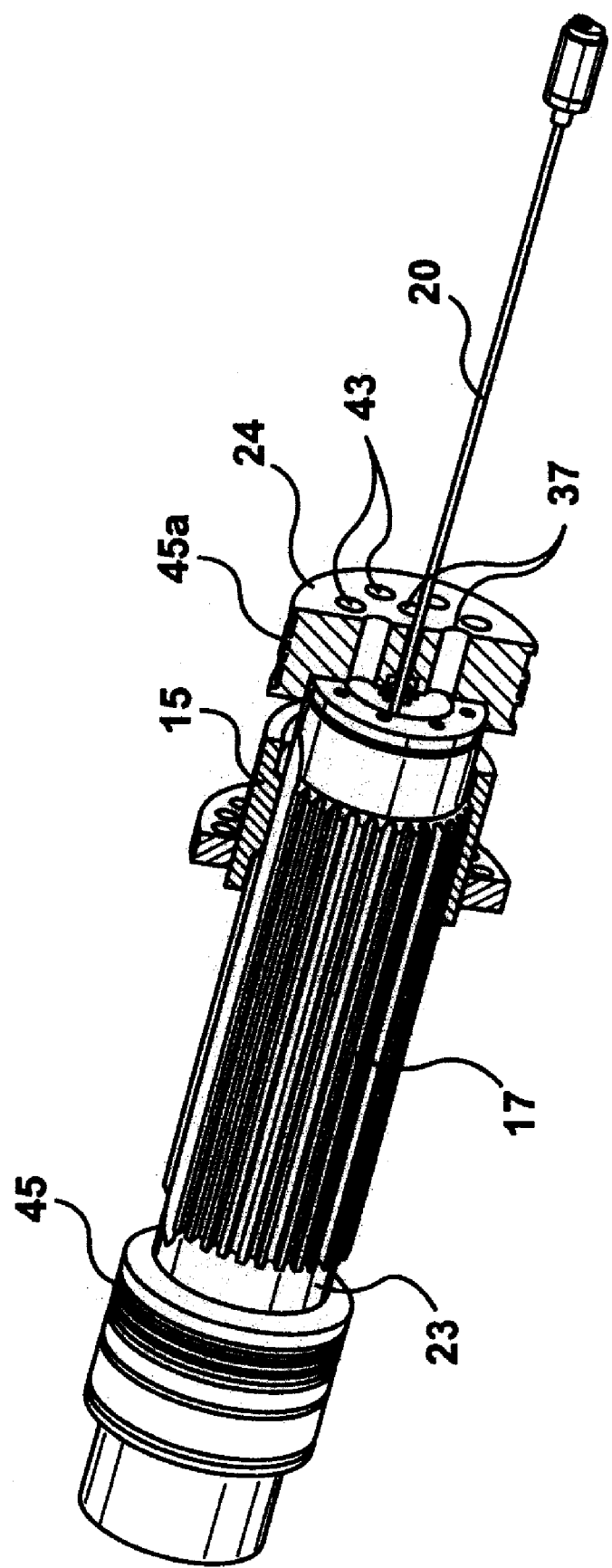
FIG. 4 is a perspective view of the piston and spline insert of the preferred drive unit.

The hollow motor 30 rotates piston 23 and thereby screw 1, which is attached to piston 23. Connector box 8 provides power to the motor 30 through wire channel 9. Stator 12 is energized to rotate the rotor 16. The motor 30 preferably has a permanent magnet rotor, however, any hollow electric motor could be used to rotate the piston 23 and screw 1. The rotor 16 is shrink fitted to the cylinder wall 18. The rotor 16 can be attached in any other way to the wall 18 so long as the rotor 16 and wall 18 move as a single unit. Spline insert 15 is connected to cylinder wall 18 by means of bolts 44. Spline insert 15 engages slots 17 (best shown in FIG. 4) on the exterior wall of piston 23. Thus, when rotor 16 rotates, cylinder wall 18 and piston 23 also rotate so there is no relative rotational motion between the cylinder wall 18 and the piston 23.

Figure 2A:
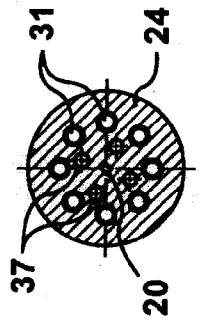
FIG. 2A is a cross-sectional view of the piston head for the drive unit shown in FIG. 2.
Figure 2B:
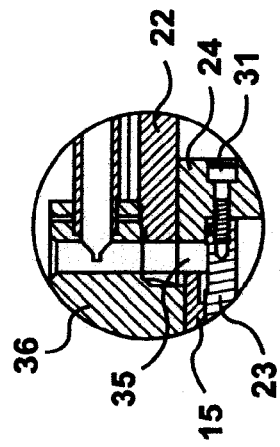
FIG. 2B is a partial sectional view illustrating a hydraulic supply channel to the piston of the drive unit shown in FIG. 2.

Cooling channels 10 are provided in motor housing 11 to enable cooling of the motor 30. Piston head 24 is attached to the rearward end of piston 23 by bolts 31 and includes a plurality of channel openings 37 (see FIGS. 2A and 4) between regions 32 and 33. This enables the piston 23 to be of minimal thickness. Piston head 24 rotates and slides on cylinder wall 22 by means of piston rings 45a. Hydraulic fluid such as hydraulic oil is supplied to regions 32 and 33 through hydraulic fluid channel 25 in rear housing 26 to propel piston 23 and screw 1 forward to inject material into a mold.

Figure 2C:
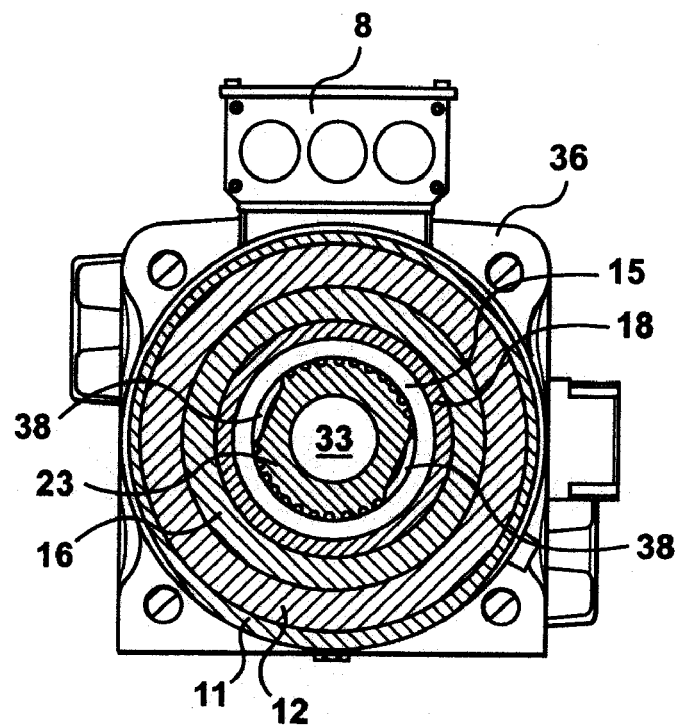
FIG. 2C is a cross-sectional view of a portion of the piston and spline insert.
Figure 2D:
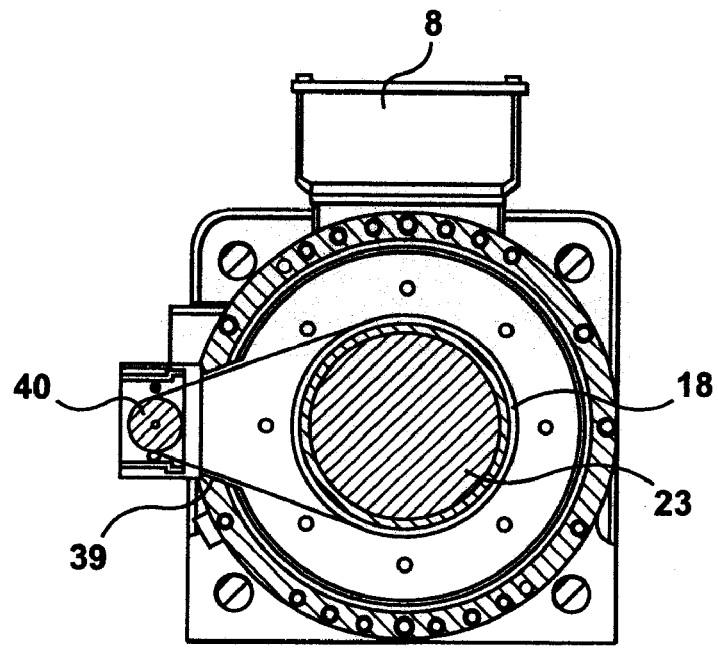
FIG. 2D is a cross sectional view of the timing belt and encoder.

The piston 23 and attached screw 1 are retracted by means of the build-up of material at the head of the screw 1 in a manner well known in the art. To prevent voids in the melt, a low pressure is applied through the region 32 to the bore side of the piston 23. Slots 38 (See FIG. 2C) are provided in spline insert 15 to ensure fluid communication between regions 34 and 35.

The cylinder wall 18 is supported in roller bearing races 13 and 14 to facilitate rotation of the assembly with minimal friction losses. Roller bearing race 13 is supported in end piece 41 and ball bearing race 14 is supported by ring 89.

Dowels 27 extend from motor housing 11 into end piece 41 and cylinder ring 36. The dowels 27 prevent any tendency for the end piece 41 and cylinder ring 36 to rotate relative to the motor stator 12 as a consequence of rotational pressures created by the rotation of the rotor 16 and piston 23.

Dowels 28 extend from rear housing 26 into cylinder wall 22 to prevent any tendency of the cylinder wall 22 to rotate in response to rotation of piston head 24.

Cylinder wall 22 is in sealing engagement with cylinder ring 36 and rear housing 26. As these seals are only subject to radial stress, they are less likely to leak or rupture than seals that are subjected to both radial and axial stresses.

Tie rods 19 extend from the rear housing 26 to the barrel retaining plate 5 and housing 3 to clamp the entire drive assembly together.

Temposonic rod 20 is attached to rear housing 26 and extends through an opening in piston head 24. A magnet assembly 21 on piston head 24 responds to movement of piston head 24 to send a signal through rod 20 that indicates the position of piston head 24 and consequently screw 1 in a manner well understood by those skilled in injection-molding.

The rotational speed and position of screw 1 is determined by means of a timing belt 39 and encoder 40 in a manner well understood in the art of servomotor control.

In operation, the region 32 is pressurized through port 25. This forces piston 23 and the attached injection screw 1 to move forward. Plastic in front of the screw 1 is injected into a mold cavity. At the end of the injection, region 32 is retained at a lower pressure for a short duration. The region 32 is then depressurized and region 35 pressurized so that piston 23 retracts a short distance. The hollow motor 30 turns on to rotate the piston 23 and the attached screw 1 to melt plastic pellets supplied to the screw 1 through opening 4. During this interval, it may be necessary to keep a relatively low pressure in region 32 to prevent voids and bubbles from forming in the melt. The motor 30 is stopped when the screw 1 retracts to a predetermined position. Further retraction of the screw 1 may occur to relieve the melt pressure. After the screw 1 has fully retracted, the next injection cycle is initiated and the injection process is repeated to provide melt to the mold cavity.

Figure 5:
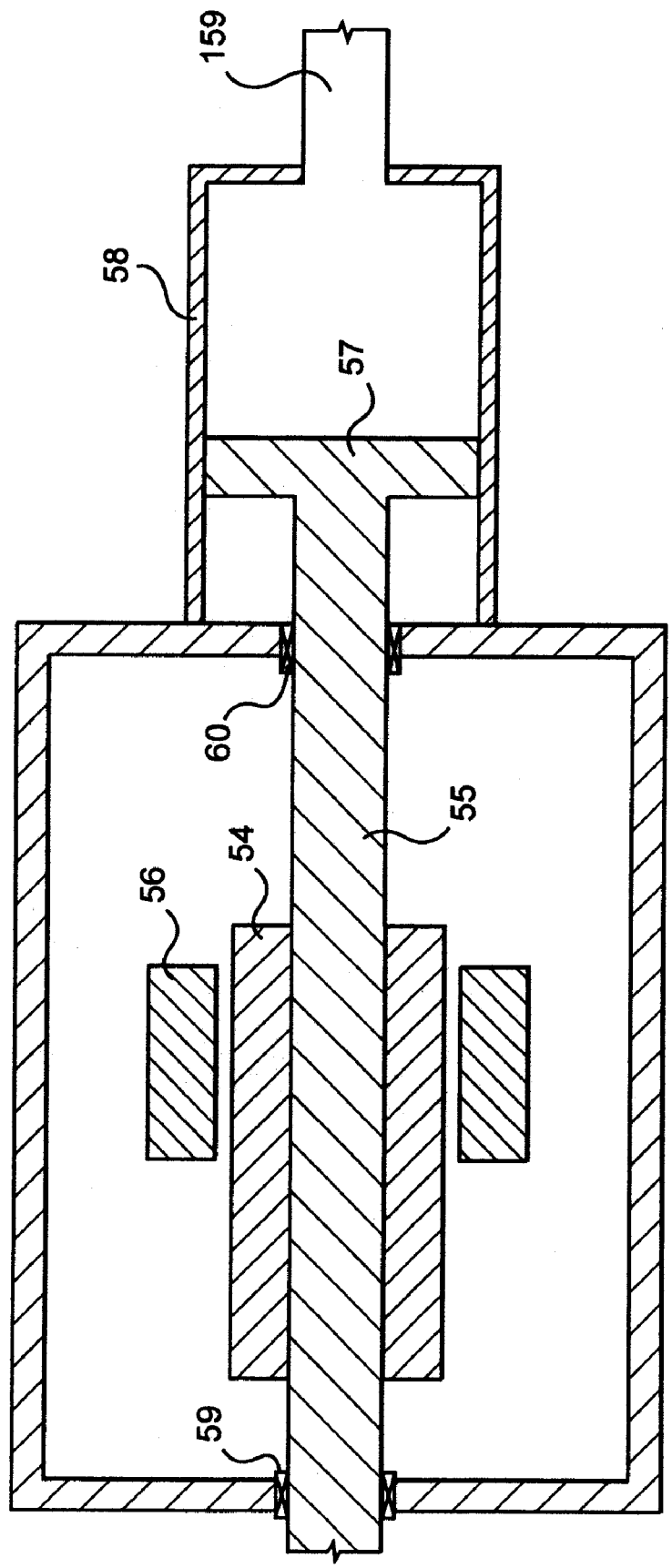
FIG. 5 is a cross-sectional sketch of another embodiment of the invention.

FIG. 5 illustrates schematically a further embodiment of the invention. In this embodiment the rotor 54 is firmly attached to a piston 55 and has a width at least as wide as the combined length of the stroke of the piston 55 and the width of the stator 56. Piston head 57 reciprocates in cylinder 58.

Cylinder 58 is shown with a single fluid inlet 159. A second inlet could be provided, however, in some applications a second inlet may not be required. For example, in the case of a plasticating screw for an injection-molding machine the build-up of plastic injection material at the end of the screw may provide sufficient pressure on the screw to move the piston back to its injection position.

This embodiment has the advantages of keeping the entire motor out of the hydraulic portion of the drive and removes the need for a spline shaft connection since the piston 55 is free to rotate and translate on the bearings 59 and 60.

The embodiment shown in FIG. 5 could be further modified to make the stator 56 longer and the rotor 54 shorter. The drive unit would operate in the same manner but the reduced size of the rotor 54 would reduce the weight on the piston 55 and reduce the cost of the motor.

Figure 6A:
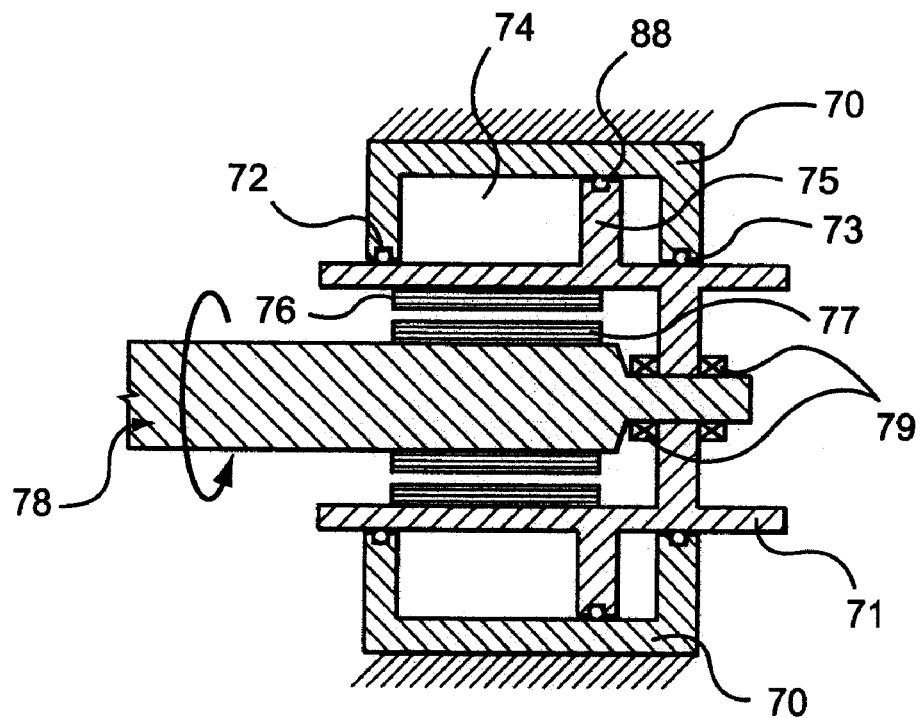
FIGS. 6A and 6B are cross-sectional views of another embodiment of the invention having the driving cylinder surrounding the hollow motor.
Figure 6B:
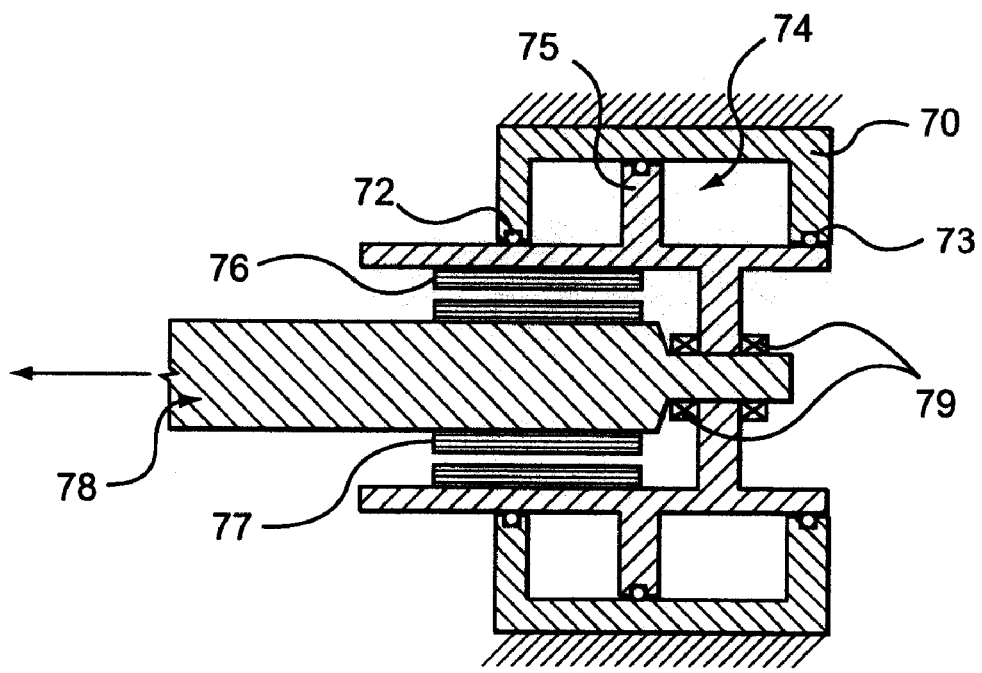

In the embodiment of the invention shown in FIGS. 6A and 6B, the drive cylinder surrounds the hollow motor. Stationary cylinder housing 70 supports a non-rotating piston 71 on bearings 72 and 73. The bearings 72 and 73 permit piston 71 to move lengthwise. Housing 70 and piston 71 form a piston chamber 74. A toroidal piston face 75 extends from piston 71 to provide a driving surface for lengthwise movement of the assembly. Piston face 75 is surrounded by piston rings 88.

The stator 76 of a hollow motor is attached to an inner surface of piston 71 in operating relationship with rotor 77 of the motor. Rotor 77 is attached to the shaft 78.

With this arrangement, rotor 77 of the hollow electric motor is rotated to thereby rotate the shaft 78. The shaft 78 is supported by and rotates in bearings 79.

Providing fluid pressure on either side of piston face 75 moves the entire assembly of the piston 71, stator 76, rotor 77 and shaft 78 lengthwise.

FIG. 6A shows the shaft 78 in a retracted position. FIG. 6B shows the shaft 78 in its extended position.

The arrangement shown in FIGS. 6A and 6B has the advantage of being of short length but does require a larger part of the assembly to move lengthwise. This embodiment also removes the requirement for a spline shaft or equivalent means.

Figure 7A:
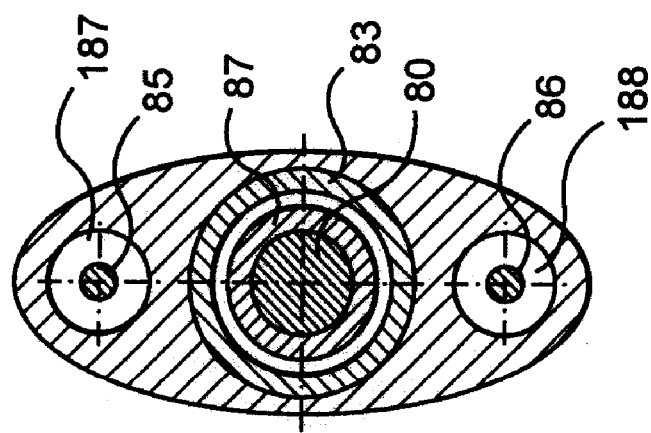
FIG. 7A is a sectional view of the embodiment shown in FIG. 7 taken along the section line 7A-7A.
Figure 7:
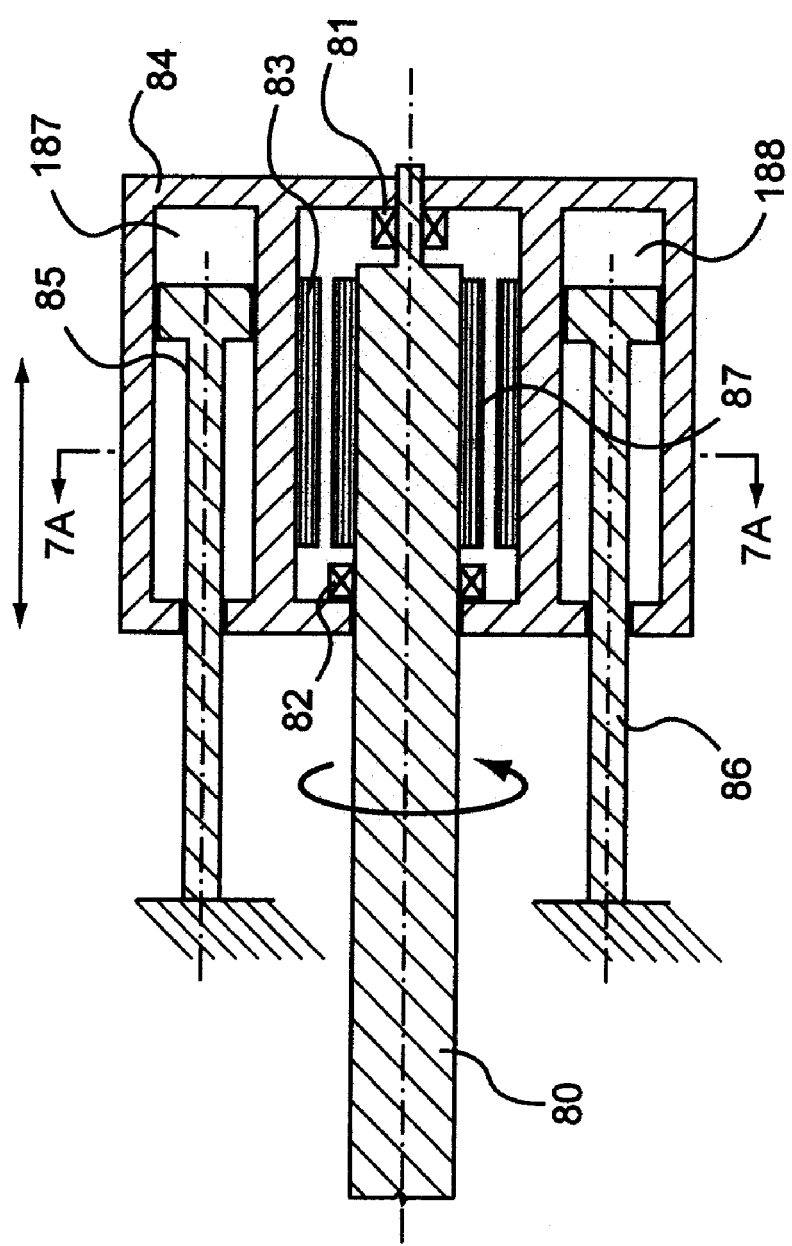
FIG. 7 is a cross-sectional side view of a further embodiment of the invention.

FIGS. 7 and 7A show a modification to the embodiment shown in FIGS. 6A and 6B where, instead of having a single toroidal piston, two separate pistons are provided. In this embodiment the pistons are fixed and the cylinder translates.

As shown in FIG. 7, shaft 80 is supported by and rotates on bearings 81 and 82. Stator winding 83 is fixed to housing 84. Housing 84 also encloses pistons 85 and 86 in cylinders 187 and 188, respectively. Fluid connections (not shown) are provided to the cylinders 187 and 188 to drive the pistons 85 and 86 in a manner well understood in the art. The rotor 87 of the hollow electric motor is fixed to the shaft 80.

In operation, energization of the stator 83 causes the rotor 87 to rotate and thereby rotate the shaft 80. Providing fluid pressure to the pistons 85 and 86 forces the housing 84 to move lengthwise. The lengthwise motion of the housing 84 forces the stator 83, rotor 87 and shaft 80 to also move in a lengthwise direction.

The embodiment shown in FIG. 7 is compact and does not require a single large toroidal cylinder or a spindle drive. However, it does require the entire housing assembly including the hollow motor and the cylinders to move lengthwise.

The selection of an appropriate embodiment of the invention would be determined by the requirements of the application being addressed. For example, if limited length was available, the embodiment shown in FIGS. 6A and 6B or FIG. 7 might be selected whereas if weight on the shaft were a concern other embodiments may be better suited.

It is to be understood by persons skilled in the art that the invention is not limited to the illustrations described herein, which are deemed to illustrate the best modes of carrying out the invention, and which are susceptible to modification of form, size, arrangement of parts and details of operation. The invention is intended to encompass all such modifications, which are within its spirit and scope as defined by the claims.

What is claimed is:

1. A drive unit operable to translate and rotate a shaft, said drive unit comprising:
    a hollow electric motor having a rotor;
    a fluid cylinder;
    means for connecting said shaft to the rotor of said hollow electric motor;
    means permitting said shaft to move lengthwise coupled with said fluid cylinder; and
    means connecting said fluid cylinder to said shaft;
    whereby said shaft may be rotated by said hollow electric motor and moved lengthwise by said fluid cylinder; and
    wherein said fluid cylinder has an outer wall coupled with said rotor.

2. The drive unit according to claim 1, wherein:
    said means for connecting said shaft to the rotor includes:
        the means permitting said shaft to move lengthwise.

3. The drive unit according to claim 2, wherein:
    said fluid cylinder encircles said hollow electric motor.

4. The drive unit according to any one of claims 2 and 3, wherein:
    said means permitting said shaft to move lengthwise is formed on said interior surface of said fluid cylinder.

5. The drive unit according to claim 1, wherein:
    said means permitting said shaft to move lengthwise includes:
        a spline insert on a wall of said fluid cylinder, and
        splines on said shaft.

6. The drive unit according to claim 2, wherein:
    said means for connecting said shaft to the rotor includes:
        a spline insert on a wall of said fluid cylinder; and
        splines on said shaft.

7. The drive unit according to claim 5, wherein:
    said fluid cylinder includes:
        a piston attached to an end of said shaft.

8. The drive unit according to claim 1, wherein:
    said rotor of said hollow electric motor is firmly attached to an outer wall of said fluid cylinder.

9. The drive unit according to claim 5, wherein:
    said spline insert on said wall of said fluid cylinder is intermediate ends of said fluid cylinder.

10. The drive unit according to any one of claims 1 and 2, wherein:
    said hollow electric motor includes:
        a stator, and said rotor has a width substantially greater than said stator.

11. The drive unit according to claim 10, wherein:
    said rotor has a width substantially equal to a combined width of said stator and a stroke of a piston in said fluid cylinder.

12. The drive unit according to claim 11, wherein:
    said rotor is firmly attached to said piston and moves lengthwise with said piston.

13. The drive unit according to any one of claims 1 and 2, wherein:
    said hollow electric motor includes:
        a stator, and said stator has a width substantially greater than said rotor.

14. The drive unit according to claim 13, wherein:
    said stator has a width substantially equal to a combined width of said rotor and a stroke of a piston in said fluid cylinder.

15. The drive unit according to claim 14, wherein:
    said rotor is firmly attached to said piston and moves lengthwise with said piston.

16. The drive unit according to claim 1, wherein:
    said fluid cylinder rotates on bearings on a fixed motor housing.

17. The drive unit according to claim 16, wherein:
    said fluid cylinder includes:
        a piston, and
        said fluid cylinder, said piston and said rotor rotate as a single unit, and said piston moves lengthwise within said fluid cylinder.

18. The drive unit according to claim 1, wherein:
    said drive unit includes:
        a motor housing, and said fluid cylinder is attached to an outer wall of said motor housing.

19. The drive unit according to claim 9, wherein:
    said shaft rotates on bearings on a motor housing.

20. The drive unit according to claim 9, wherein:
    said drive unit includes:
        a motor housing; and
        said fluid cylinder is located along a periphery wall of said motor housing.

21. The drive unit according to claim 19, wherein
    said rotor is firmly attached to said shaft and moves lengthwise with said shaft.

22. The drive unit of any one of claims 1, 2, 5, 20 and 21, wherein:
    said fluid cylinder is at least partially situated within confines of said hollow electric motor.

23. The drive unit according to claim 4, wherein:
    said means for connecting said shaft to the rotor includes:
        a spline insert on a wall of said fluid cylinder; and
        splines on said shaft.

24. The drive unit according to claim 23, wherein:
    said fluid cylinder includes:
        a piston attached to an end of said shaft.

* * * * *